(12) United States Patent
Orndorff et al.

(10) Patent No.: US 8,499,921 B1
(45) Date of Patent: Aug. 6, 2013

(54) ADJUSTABLE GUIDE RAIL ASSEMBLIES

(75) Inventors: Jason Matthew Orndorff, Lawrenceburg, IN (US); Todd Michael Yeagle, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/351,472

(22) Filed: Jan. 17, 2012

(51) Int. Cl.
*B65G 25/00* (2006.01)

(52) U.S. Cl.
USPC ............... 198/480.1; 198/479.1; 198/481.1; 198/836.1; 198/836.3

(58) Field of Classification Search
USPC .......... 198/470.1, 473.1, 479.1, 480.1, 481.1, 198/836.1, 836.3
See application file for complete search history.

(56) References Cited

U.S. PATENT DOCUMENTS

| | | | |
|---|---|---|---|
| 1,981,641 A | | 11/1934 | Benoit |
| 2,156,020 A | * | 4/1939 | Lathrop ................ 198/836.3 |
| 2,324,312 A | | 7/1943 | Meyer et al. |
| 3,957,154 A | | 5/1976 | Shiba |
| 4,124,112 A | | 11/1978 | Mohney et al. |
| 4,932,517 A | * | 6/1990 | Johnson ................ 198/836.1 |
| 5,029,695 A | | 7/1991 | Kovara |
| 5,046,599 A | | 9/1991 | Hamano |
| 5,058,731 A | | 10/1991 | Corniani et al. |
| 5,082,105 A | | 1/1992 | Tincati |
| 5,099,979 A | * | 3/1992 | Kehrel ................ 198/345.1 |
| 5,246,314 A | * | 9/1993 | Smith et al. ................ 406/86 |
| 5,291,988 A | * | 3/1994 | Leonard ................ 198/836.3 |
| 5,322,160 A | | 6/1994 | Markiewicz et al. |
| 5,540,320 A | | 7/1996 | Sarto et al. |
| 5,542,789 A | * | 8/1996 | Aidlin et al. ................ 406/88 |
| 5,551,555 A | | 9/1996 | Gladieux et al. |
| 5,581,975 A | | 12/1996 | Trebbi et al. |
| 5,590,753 A | | 1/1997 | Bertschi et al. |
| 5,711,411 A | * | 1/1998 | Zurweller ............... 198/470.1 |

(Continued)

FOREIGN PATENT DOCUMENTS

| | | |
|---|---|---|
| DE | 19903319 A | 8/1999 |
| EP | 0 894 544 A2 | 2/1999 |

(Continued)

OTHER PUBLICATIONS

Zepf Technologies UK, "Global leader in container handling changepart technology", product brochure, 18 pages, Zepf Technologies UK, Cumbernauld, UK. (Describes equipment believed to have been sold more than one year before filing date.)

(Continued)

*Primary Examiner* — Douglas Hess
(74) *Attorney, Agent, or Firm* — Jeffrey V Bamber; Kim W Zerby

(57) ABSTRACT

An adjustable guide rail assembly for a conveyor system includes an adjustable guide member having a face extending between opposite sides, a large radius face segment and a small radius face segment. The large radius face segment and the small radius face segment extend widthwise between the opposite sides of the adjustable guide member and each define an arcuate guide path for a three dimensional article. A radius of the arcuate guide path changes by rotating the adjustable guide member from a large article configuration where the large radius face segment having a larger radius defines the arcuate guide path to a small article configuration where the small radius face segment having a smaller radius defines the arcuate guide path.

20 Claims, 9 Drawing Sheets

(56) References Cited

U.S. PATENT DOCUMENTS

| | | | |
|---|---|---|---|
| 5,927,480 | A | 7/1999 | McCaffrey et al. |
| 5,967,295 | A | 10/1999 | Ledingham |
| 6,050,396 | A | 4/2000 | Moore |
| 6,059,096 | A | 5/2000 | Gladieux |
| 6,244,429 | B1 | 6/2001 | Drewitz |
| 6,302,258 | B1 * | 10/2001 | Verona ............... 198/392 |
| 6,332,740 | B1 * | 12/2001 | Bernard et al. ............. 406/88 |
| 6,360,880 | B1 | 3/2002 | Quellette |
| 6,378,695 | B1 | 4/2002 | Rinne |
| 6,578,702 | B2 | 6/2003 | Falkowski |
| 6,827,203 | B2 | 12/2004 | Andreoli et al. |
| 6,889,823 | B2 | 5/2005 | Delaparte et al. |
| 7,207,428 | B2 | 4/2007 | Huttner |
| 7,398,871 | B1 | 7/2008 | Basgil et al. |
| 7,431,150 | B2 | 10/2008 | Ranger |
| 7,520,380 | B2 | 4/2009 | Ranger |
| 7,617,926 | B2 | 11/2009 | Jacob et al. |
| 7,681,720 | B2 * | 3/2010 | Monti ............... 198/867.01 |
| 7,735,636 | B2 | 6/2010 | Lundberg |
| 7,743,907 | B2 * | 6/2010 | Weinbrenner et al. ..... 198/459.2 |
| 7,748,522 | B2 * | 7/2010 | Reiner ............... 198/836.1 |
| 7,748,523 | B2 | 7/2010 | Robertson |
| 7,815,041 | B2 | 10/2010 | Guenther |
| 8,025,141 | B1 * | 9/2011 | Bouldin ............... 198/345.1 |
| 8,186,503 | B1 * | 5/2012 | Burchell et al. ......... 198/836.3 |
| 8,240,459 | B2 * | 8/2012 | Bernhard ............... 198/481.1 |
| 2007/0271871 | A1 | 11/2007 | Spence et al. |
| 2008/0116042 | A1 | 5/2008 | McAlister et al. |
| 2010/0193331 | A1 | 8/2010 | McAllister et al. |
| 2011/0272245 | A1 | 11/2011 | Papsdorf |
| 2011/0272246 | A1 | 11/2011 | Papsdorf |

FOREIGN PATENT DOCUMENTS

| | | |
|---|---|---|
| JP | 10035879 A | 2/1998 |
| SE | 519716 C2 | 4/2003 |
| WO | WO-9412412 | 6/1994 |

OTHER PUBLICATIONS

Flex-Line Automation Inc., Robo Guide Adjustable Guide Rail System, introduced at 2000 PMMI show, website: www.flex-lineautomation.com/robo-guide.htm, Chester, IL, USA.

Septimatech Group Inc., Unison®, Modular flex guide rail adjustment system, website: www.septimatech.com/guiderailunison.php, Septimatech Group Inc., Waterloo, Ontario, Canada. (Describes equipment believed to have been sold more than one year before filing date.)

U.S. Appl. No. 12/775,902, filed May 7, 2010, Clifford Theodore Papsdorf.

U.S. Appl. No. 12/775,918, filed May 7, 2010, Clifford Theodore Papsdorf.

* cited by examiner

ADJUSTABLE GUIDE RAIL ASSEMBLIES

FIELD

The present invention is directed to an adjustable guide rail assembly for conveyor systems that is used in conveying articles on an automated handling line.

BACKGROUND

Guide rails are used on various types of automated handling lines to guide and help convey containers to and from, and within, various machines, such as rotary packaging machines. As one example, guide rails may be used with star wheels to convey containers along an arcuate path. Star wheels can be used to convey containers between rectilinear conveyors to a rotating machine and back to a rectilinear conveyor. Such star wheels may be used with a number of containers that include bottles, cans and tins. The various rotary packaging machines may perform various functions, e.g. cleaning, filling, capping or labeling a container.

Containers are generally retained within a pocket by supporting the container between a pair of contact surfaces that urge the container against the guide rail that encircles at least part of the star wheel's periphery. A second type of star wheel provides an alternative form of support by providing pairs of jaws to grip the container about its sides.

The guide rails and star wheels may convey containers to a closely-defined point within a rotary packaging machine or along a closely-defined path through a rotary packaging machine. For example, the container may be a bottle with a narrow neck that is presented to a filling machine: when presented, the neck of the bottle must be on the correct path such that it passes exactly beneath a filling nozzle. Thus, it is important that the center of the container follows a predetermined path and that the position of the bottle in the direction of travel is accurately controlled.

In general, any automated handling line may be used to process containers of varying shapes and sizes. In the past, each guide rail and star wheel could only handle containers of a specific shape and size, so this meant having to change the star wheel and/or guide rail each time a different container was introduced onto a handling line. This is undesirable as it is both time consuming and necessitates having to keep a stock of different-sized star wheels and guide rails.

SUMMARY

In one embodiment, an adjustable guide rail assembly for a conveyor system includes an adjustable guide member having a face extending between opposite sides, a large radius face segment and a small radius face segment. The large radius face segment and the small radius face segment extend widthwise between the opposite sides of the adjustable guide member and each define an arcuate guide path for a three dimensional article. A radius of the arcuate guide path changes by rotating the adjustable guide member from a large article configuration where the large radius face segment having a larger radius defines the arcuate guide path to a small article configuration where the small radius face segment having a smaller radius defines the arcuate guide path.

In another embodiment, a conveyor system includes a star wheel that conveys three dimensional articles around an arcuate guide path. The star wheel rotates about a central axis. An adjustable guide rail assembly defines the arcuate path adjacent the star wheel. The adjustable guide rail assembly includes an adjustable guide member having a profile that transitions from a smaller radius along a small radius face segment of the adjustable guide member to a larger radius along a large radius face segment of the adjustable guide member. A radius of the arcuate guide path changes by rotating the adjustable guide member from a large article configuration where the large radius face segment having a larger radius defines the arcuate guide path to a small article configuration where the small radius face segment having a smaller radius defines the arcuate guide path.

In another embodiment, a method of adjusting an adjustable guide assembly for changing an arcuate guide path about a star wheel is provided. The method includes providing an adjustable guide member having a profile that transitions from a smaller radius along a small radius face segment of the adjustable guide member to a larger radius along a large radius face segment of the adjustable guide member. The adjustable guide member defines the arcuate guide path for a three dimensional article. The adjustable guide member rotates from a large article configuration where the large radius face segment of the adjustable guide member having the larger radius defines the arcuate guide path to a small article configuration where the small radius face segment of the adjustable guide member having the smaller radius defines the arcuate guide path.

An automated adjustment mechanism for adjusting an adjustable star wheel to accommodate different articles is also disclosed. The automated adjustment mechanism may be used with any suitable adjustable star wheel.

BRIEF DESCRIPTION OF THE DRAWINGS

The following detailed description will be more fully understood in view of the drawings in which.

Figure 1:
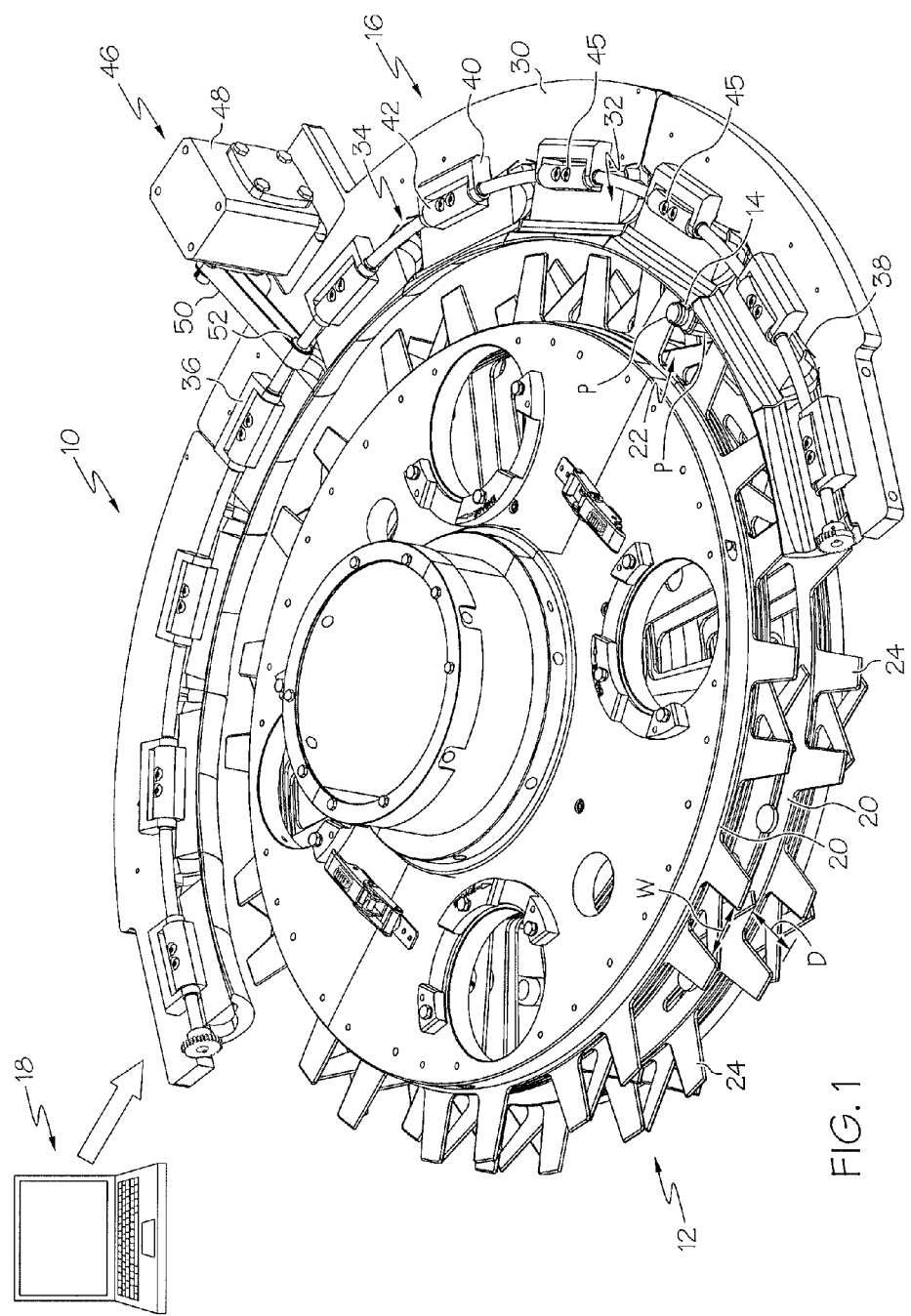
FIG. 1 is a perspective view showing one embodiment of an adjustable star wheel assembly together with an adjustable guide rail assembly and a computer for automatically adjusting the star wheel to fit different articles.

The embodiment of the system shown in the drawings is illustrative in nature and is not intended to be limiting of the invention defined by the claims. Moreover, the features of the invention will be more fully apparent and understood in view of the detailed description.

DETAILED DESCRIPTION

Embodiments described herein generally relate to an adjustable (or reconfigurable) guide rail assembly. The adjustable guide rail assembly includes a number of individual adjustable guide members that together define an arcuate or curvilinear guide path for three dimensional articles (e.g., containers). The arcuate or curvilinear guide path may be of constant or varying radius. As one example, the arcuate guide path may be about a star wheel conveyor. The adjustable guide members have a profile that can change a radius of curvature of the arcuate guide path upon rotation of the adjustable guide members. Such a guide member arrangement can accommodate three dimensional articles of different sizes guided along the arcuate guide path.

FIG. 1 shows one non-limiting embodiment of a conveyor system 10 that includes an adjustable star wheel assembly 12 for conveying three dimensional articles 14 around an arcuate guide path. In the embodiment shown in FIG. 1, the conveyor system 10 includes the adjustable star wheel assembly 12, an adjustable guide rail assembly 16, and an automated adjustment mechanism that includes a computer 18 for adjusting the adjustable star wheel assembly 12 and/or adjustable guide rail assembly 16 to accommodate different size and/or shape articles 14. The automated adjustment mechanism may be used with any suitable adjustable star wheel assembly and/or adjustable guide rail assembly.

The conveyor system 10 including the star wheel assembly 12 and the adjustable guide rail assembly 16 can be used to convey numerous different types of three dimensional articles 14. Such articles include, but are not limited to: bottles, cans, containers, razors, razor blade heads and handles, tampon tubes, and deodorant stick containers. While the conveyor system 10 including the star wheel assembly 12 and the adjustable guide rail assembly 16 can easily transport conventionally-shaped articles (e.g., cylindrical, and/or symmetrical articles), the conveyor system 10 including the star wheel assembly 12 and the adjustable guide rail assembly 16 is particularly suited to transport and control articles having shapes that are challenging to transport by conventional means. The conveyor system 10 including the star wheel assembly 12 and the adjustable guide rail assembly 16 can, for example, be used to transport: bottles with non-flat or rounded bottoms that would be unstable on a horizontal surface; bottles with small bases that will easily tip; bottles with angled and/or off-center necks; asymmetrical bottles; bottles of non-constant cross-section, etc.

Figure 2:
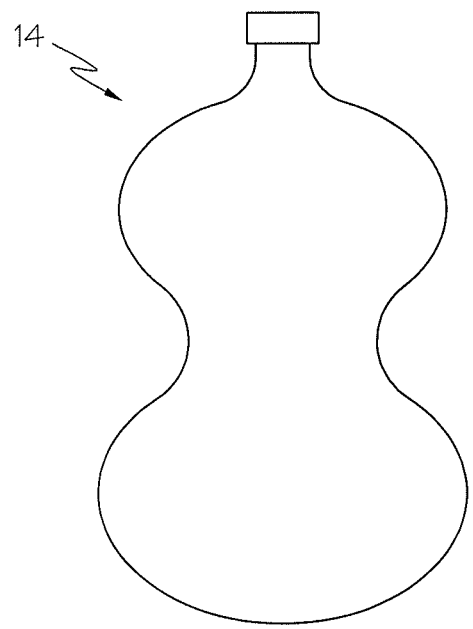
FIG. 2 illustrates an embodiment of an article capable of being conveyed by the adjustable star wheel assembly and the adjustable guide rail assembly of FIG. 1.
Figure 3:
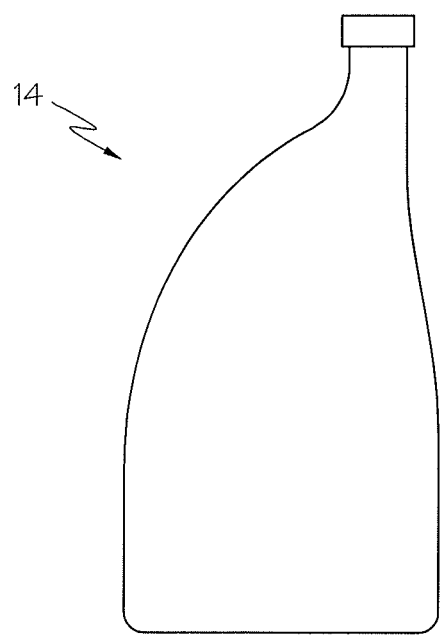
FIG. 3 illustrates another embodiment of an article capable of being conveyed by the adjustable star wheel assembly and the adjustable guide rail assembly of FIG. 1.

One such bottle is shown in FIG. 2. The bottle 14 is an example of a bottle having a rounded bottom that would be unstable on a horizontal surface. In addition, the bottle 14 is also asymmetrical in that it has elliptical cross-sections that are twisted so that the cross-sections are not in alignment along the bottle's height. FIG. 3 shows an example of a bottle 14 with an angled neck. This bottle 14 must be held at an angle with its bottom tilted relative to a horizontal surface in order to fill the same.

As shown in FIG. 1, the star wheel assembly 12 comprises a plurality of rotatable elements, which may be in the form of rotatable disks, designated generally by reference number 20. The rotatable elements 20 are stacked and may be said to be concentric in that they have a common center although the center of each rotatable element 20 typically lies in a different plane.

The adjustable star wheel assembly 12 can be adjusted in any suitable manner to accommodate articles 14, such as bottles, with different shapes. In the embodiment shown, a width W of a star wheel pocket 22 can be adjusted by rotating rotatable elements 20. To accommodate a wider article, the rotatable elements 20 are rotated in opposite directions so that the control surfaces and contact points P on elements or extensions 24 of the rotatable elements 20 move away from each other. A depth D of the star wheel pocket 22 is also adjusted by rotating the rotatable elements 20. To accommodate a deeper bottle, the rotatable elements 20 are rotated so that the control surfaces of the rotatable elements 20 move away from each other to create a deeper pocket. Often, the cross sectional shape of a bottle 14 will change with elevation. For instance, the bottle 14 might have a wider base and smaller top. In this case, the upper and lower sets of rotatable elements 20 can be adjusted independently to create a large pocket for the bottom and a smaller pocket for the top. Bottles 14 can also be asymmetric about the vertical central plane. In this case, the rotatable elements 20 with larger angled contact surfaces can be adjusted to varying depths to create an asymmetric pocket 22. In this embodiment, adjusting the relative rotation of all rotatable elements 20 creates a fully amorphous star wheel pocket 22 that will adjust to virtually any article shape and fully supports the article 14 at multiple elevations.

As shown and described herein, the boundaries of the pockets 22 may be configured solely by at least partially rotating at least some of rotatable elements 20 to adjust the angular displacement or location of control surfaces on the different rotatable elements 20. The control surfaces form the pocket 22 that is configured to generally follow the contour of the three dimensional article being conveyed. The positions of the rotatable elements 20 are then fixed before rotating the star wheel assembly 12 to transport the articles 14. All of the adjustments to set the width W and depth D of the pockets 22 are made by rotational movement around the central axis of the star wheel assembly 12. The star wheel assembly 12 may, therefore, be free of elements that are axially movable inwardly and outwardly (that is, inwardly and outwardly movable in a radial direction) to form the boundaries of the pocket 22. The star wheel assembly 12 may also be free of grippers, fingers or elements that have a pivoting axis that pivot about a point that is at a location other than the axis of rotation of the star wheel assembly 12. The adjustable star wheel assembly 12 may, thus, have relatively few moving parts, and the adjustment of the width and depth of the pockets 22 can be controlled by a single mechanism. Such a star wheel is further described in U.S. Patent Publication Nos. U.S. 2011/0272245 A1 and U.S. 2011/0272246 A1.

Figure 4:
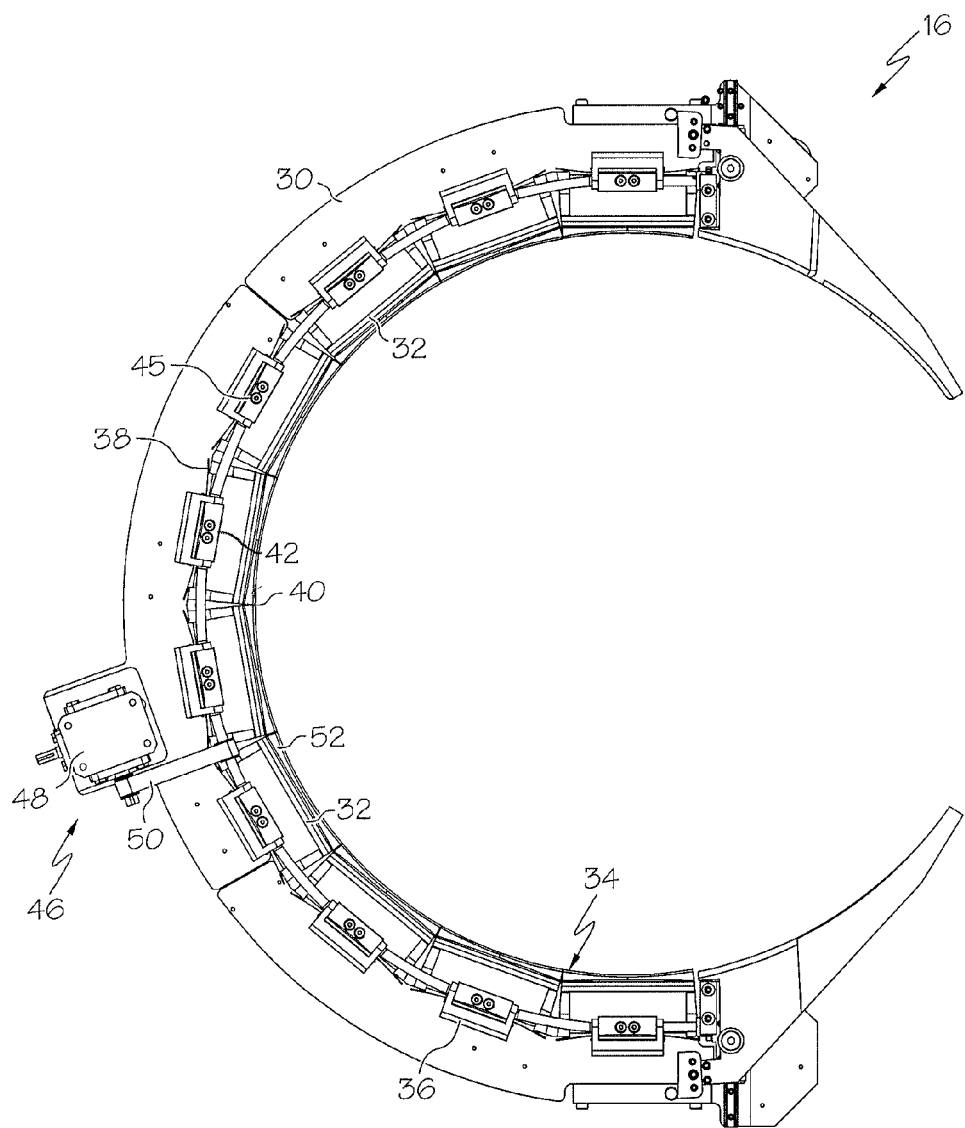
FIG. 4 is a top view of the adjustable guide rail assembly of FIG. 1 in isolation.

The guide rail assembly 16 is adjustable to conform to a constant radius that establishes the outer path of a bottle or other article 14 held in the adjustable star wheel assembly 12. Referring also to FIG. 4, the guide rail assembly 16 includes an outer support frame 30 that is held in a fixed position relative to the star wheel assembly 12 and an array of adjustable guide members 32 that are rotatably connected to the outer support frame 30. The adjustable guide members 32 can be in any suitable shape that is capable of defining multiple arcuate guide paths having different radii. The radius of the arcuate guide path may need to be adjusted to accommodate different bottle depths to ensure that the center of the bottle neck will travel along the same arcuate guide path. This may be important in order to allow the neck of the bottles to line up with a liquid filler/capper. Further, the center of the arcuate guide path followed by the adjustable guide members 32 may be maintained so it is concentric with the star wheel assembly 12.

Each adjustable guide member 32 is rotatably connected to the outer support frame 30 by a rotation adjustment device 34 and brackets 36. In some embodiments, the rotation adjustment device 34 may be in the form of a torsion drive cable that is rotatably received by the brackets 36 extending along an inner edge 38 of the outer support frame 30. The adjustable guide members 32 may also be rotatably received by the brackets 36 with the torsion drive cable 34 extending through an opening 40 in a mounting portion 42 of the adjustable guide members 32. Fasteners 45 may be used to connect the adjustable guide members 32 to the torsion drive cable 34 such that the adjustable guide members 32 rotate about a horizontal axis provided by the connection of the adjustable guide members 32 with their respective brackets 36 and the torsion drive cable 34. As can be seen, the brackets 36 place the torsion drive cable 34 in an arcuate configuration extending about the star wheel assembly 12 (FIG. 1). The brackets 36 also locate the adjustable guide members 32 side-by-side about the star wheel assembly 12 such that their profiles 44 define the arcuate guide path adjacent the star wheel assembly 12. While a torsion drive cable is discussed herein, other suitable rotation adjustment devices may be used. As one example, an array of rod segments may be interconnected using universal joints to transfer torque around a non-linear path to rotate the adjustable guide members 32. Another means of transferring motion from one adjustable guide member 32 to the next is to form or provide the members 32 with beveled gear teeth on their ends 68 and 70 (from FIG. 10) so the teeth of one member 32 meshes with the teeth of the member 32 adjacent to it.

An adjustment control system 46 may include any suitable type of manual or automatic adjustment mechanism for changing the radius of the arcuate guide path defined by the adjustable guide members 32. In the embodiment shown in FIGS. 1 and 4, the adjustment control system 46 includes a gearmotor system 48 including a gearbox and a motor that is connected to the torsion drive cable 34 by a drive belt 50. The drive belt 50 may or may not have teeth and may be connected to a driven member 52 (e.g., a gear or friction member) that is, in turn, rigidly connected to the torsion drive cable 34. Such an automatic adjustment control system 46 may, but need not, be linked to a computer, such as the computer 18 (FIG. 1) that establishes the configuration of the pockets 22 of the star wheel assembly 12 for a particular size and shape article 14. In such a case, the computer 18 could be programmed to move the automatic adjustment control system 46 to adjust the adjustable guide members 32 (e.g., by rotating the adjustable guide members 32) thereby adjusting the arcuate guide path to the desired radius for the article 14 defined in a CAD program or other suitable computer program.

The gearmotor system 48 may be powered by electric current. Wires may provide current from a source of electric current to the gearmotor system 48 to power the gearmotor system 48. In one embodiment, the motor position may be controlled by a controller. The system for controlling the gearmotor system 48 can be in the form of a closed loop control system that provides feedback to the controller of the true motor position with a measurement device such as an encoder or resolver. However, in other embodiments, the desired position can be commanded to an open loop device such as a stepper motor without position feedback. Additional wires can be used to transmit the feedback of motor and/or adjustable guide member position to the controller. Communication is also possible between a computer and a controller or motor drive rotating with the guide rail assembly 16 by wireless means using radio frequency, light, or sound. Power can be supplied to the drive gearmotor system 48 by batteries or can be transmitted from the base machine by commutation or induction.

The guide rail assembly 16 may be adjusted for a new shape and/or size article 14 manually, at least partially automatically, or if desired, fully automatically with the touch of a button or other command. For instance, the adjustment control system 46 may include the computer 18 (FIG. 1). The computer 18 can be provided with a CAD program in which the CAD program contains the dimensions of a three dimensional article 14 at various levels or elevations. The CAD program can be used to determine the necessary rotational angle for each of the adjustable guide members 32 to provide the arcuate guide path suitable to support the desired bottle geometry. The process of using the CAD program to determine the guide rail assembly 16 adjustment setting can be automated. For example, the operator can input a bottle file into the computer 18 and the automated program will automatically rotate the adjustable guide members 32 to determine the correct settings. This can be faster than an operator manually manipulating the guide rail assembly 16 (e.g., using a crank) and bottle models to determine the correct settings. The computer 18 can be in communication with the adjustment control system 46 that controls the gearmotor system 48 to adjust the rotational (or angular) position of each of the adjustable guide members 32 to accommodate the dimensions of a three dimensional article 14. The CAD program can also be used to generate a table or list of numbers that describe a list of motor positions for the adjustable guide members 32. This list of positions can be uploaded or manually entered into a programmable logic controller (PLC) that controls the position of the gearmotor system 48. A programmable logic controller is a digital computer used for automation of electromechanical processes. The PLC may be a separate device, or it may be incorporated into the computer 18. The CAD program can alternatively be used to enable manual adjustment of the guide rail assembly 16. For example, in the embodiment shown in FIG. 1, the CAD program can provide a list of numbers that are the adjustment settings for the manual adjustment of the rotational angle of the adjustable guide members 32.

Figure 5:
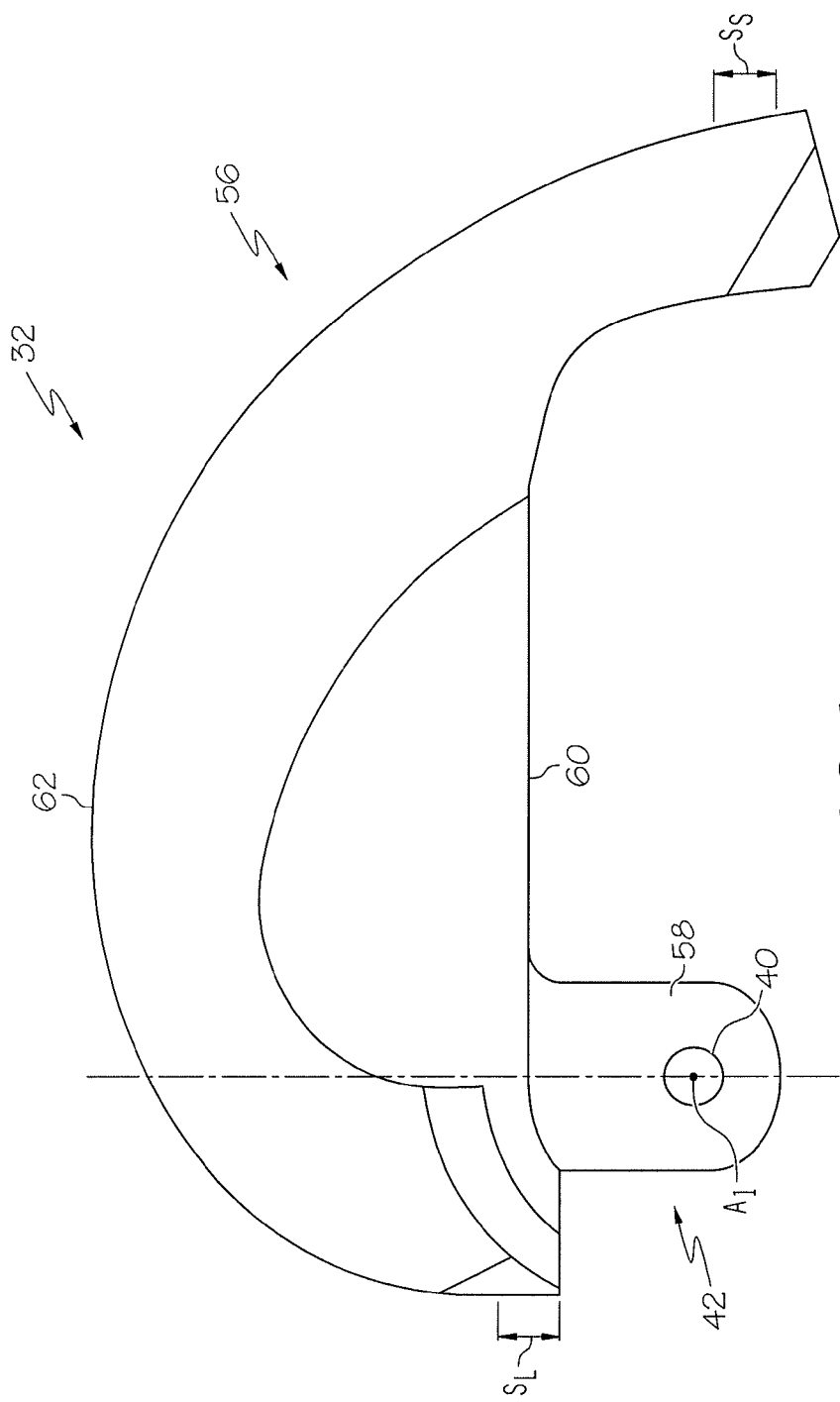
FIG. 5 is a side view of an embodiment of an adjustable guide member for use with the adjustable guide rail assembly of FIG. 4.

Referring to FIG. 5, a side view of the adjustable guide member 32 is shown in isolation and includes the mounting portion 42 and a guide portion 56. The mounting portion 42 includes a mounting member 58 that extends outwardly from an underside 60 of the guide portion 56 in a direction generally away from the guide portion 56. The opening 40 extends through the mounting portion 42 that is sized to slidably receive the torsion drive cable 34 (FIG. 1). Once slidably received, the mounting portion 42 can fasten to or clamp to the drive cable 34 so they move as one. The opening 40 provides an eccentric axis of rotation $A_1$ about which the adjustable guide member 32 rotates. The axis $A_1$ may be substantially horizontal and substantially parallel to the arcuate guide path. In some embodiments, the mounting portion 42 and the guide portion 56 may be formed integrally together of the same material. In other embodiments, the mounting portion 42 may be formed separately from the guide portion 56 and may attach (e.g., removably attach) to the guide portion 56.

The guide portion 56 generally includes a large radius face segment $S_L$ and a small radius face segment $S_S$. The "radius" referred to by the "large radius face segment" and the "small radius face segment" refers to the radius of the arcuate guide path (to the center of the star wheel assembly 12) that is formed by the large radius face segment $S_L$ and the small radius face segment $S_S$ when being used to guide the article 14 about the star wheel assembly 12 (FIG. 1). As can be seen, the axis $A_1$ is nearer the large radius face segment $S_L$ than the small radius face segment $S_S$. However, other axis $A_1$ locations are possible.

The guide portion 56, in side section, may have a peripheral surface 62 having a somewhat round and spiral shape. A spiral is a plane curve generated by a point moving around a fixed point while constantly receding from or approaching the fixed point. For example, the fixed point may be on the axis $A_1$. The spiral shape may resemble any suitable spiral shape, such as Archimedes, logarithmic, parabolic and hyperbolic spiral shapes. Such a spiral shape of the peripheral surface 62 in side section can provide multiple path defining face segments extending transversely to the peripheral surface 62 of the guide portion 56.

Figure 6:
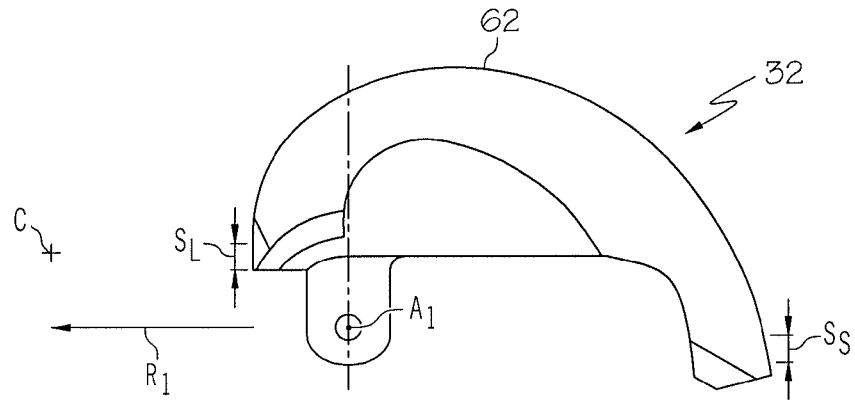
FIGS. 6-8 illustrate operation of the adjustable guide member of FIG. 5.
Figure 7:
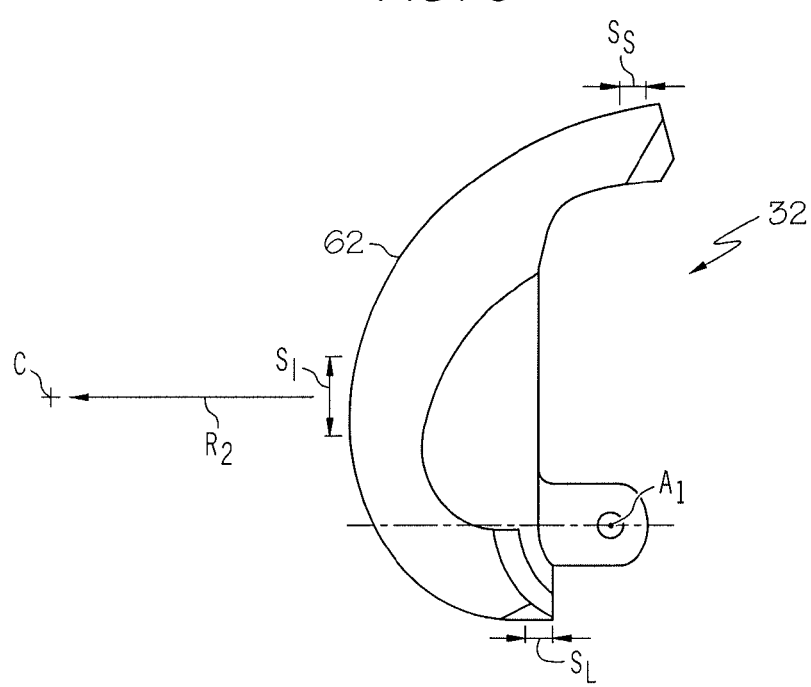
Figure 8:
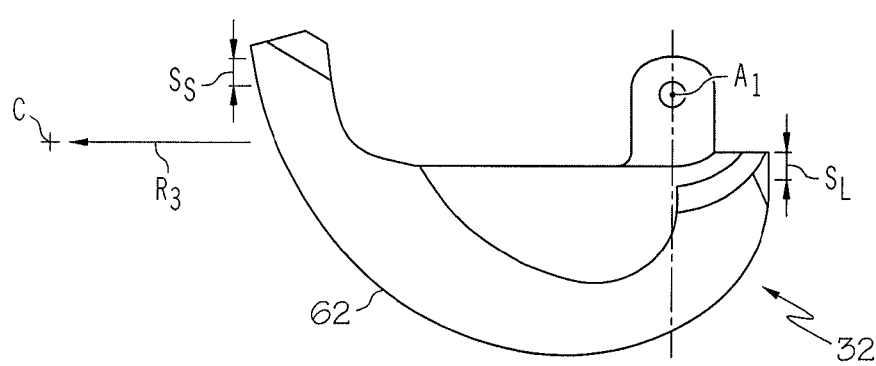

FIGS. 6-8 briefly illustrate operation of the adjustable guide member 32 and the effect of the fixed axis $A_1$ and spiral peripheral surface 62. A more detailed discussion of operation of the adjustable guide member 32 will be described below. FIG. 6 illustrates the adjustable guide member 32 in a large radius configuration where the large radius face segment $S_L$ of the adjustable guide member 32 faces the center C of the star wheel assembly 12. FIG. 7 illustrates the adjustable guide member 32 in an intermediate radius configuration (e.g., between about 0 and about 180 degrees from the large radius configuration, such as about 90 degrees) where the large radius face segment $S_L$ and the small radius face segment $S_S$ face away from the center C of the star wheel assembly 12. FIG. 8 illustrates the adjustable guide member 32 in a small radius configuration (e.g., greater than about 90 degrees from the large radius configuration, such as about 180 degrees) where the small radius face segment $S_S$ of the adjustable guide member 32 faces the center C of the star wheel assembly 12. As will be discussed below, the adjustable guide member 32 has a concave profile extending along the lengths or face segments of the adjustable guide member 32 that each provides an arcuate path segment of constant radius, the length of which changes continuously as the adjustable guide member 32 rotates that is concentric with the center C of the star wheel assembly 12. Referring to FIG. 6, for example, the length of the radius $R_1$ provided by the large radius face segment $S_L$ to the center C is greater than the radius $R_2$ provided by the intermediate radius face segment 64, which is greater than the radius $R_3$ provided by the small radius face segment $S_S$. (The arrows $R_1$, $R_2$ and $R_3$ are not drawn to scale.) From the large radius configuration to the small radius configuration, the center of curvature of the arcuate path remains substantially stationary, which may be colinear with the central axis C of the star wheel assembly 12 as the adjustable guide member 32 rotates. Such an arrangement can allow for accommodation of articles 14 of different sizes depending on the angular position of the adjustable guide member 32.

Figure 9:
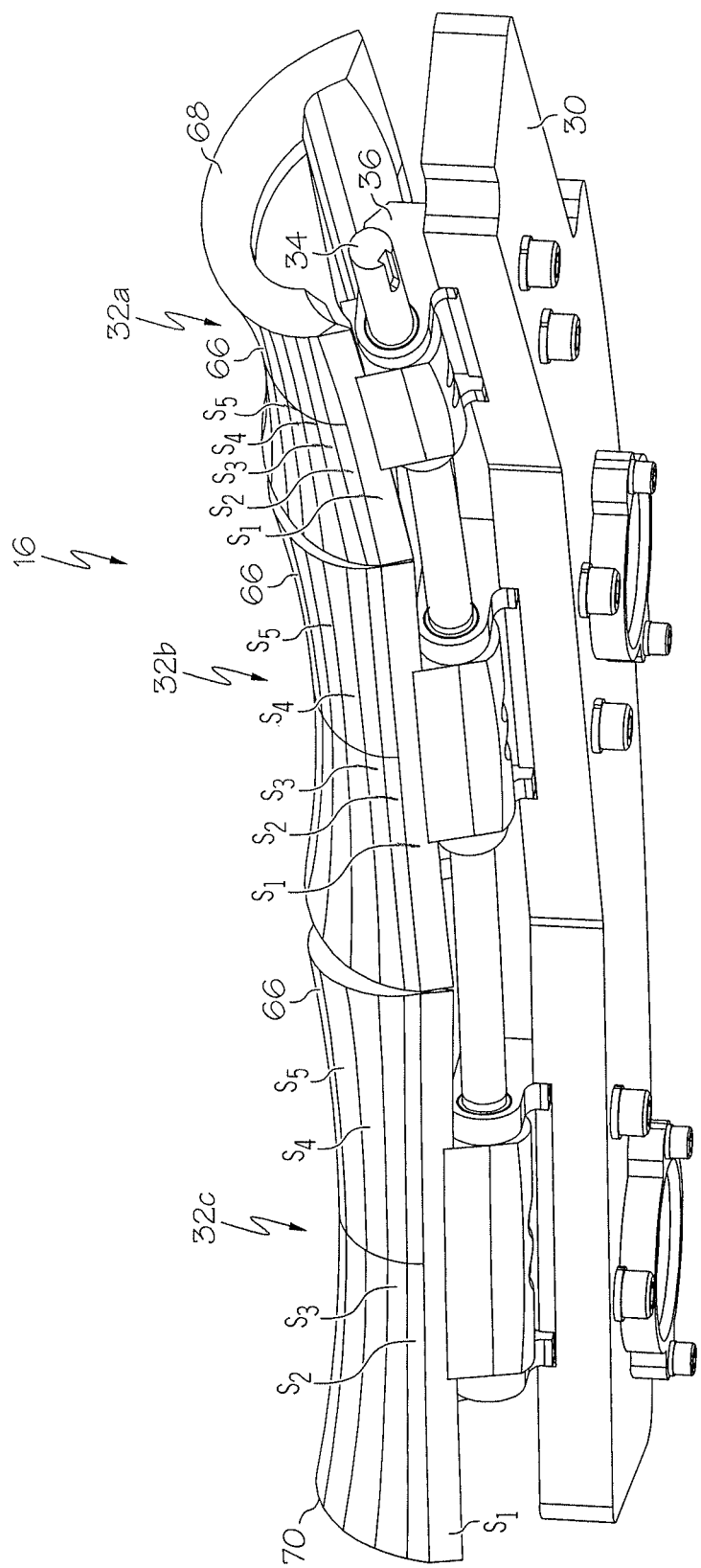
FIG. 9 is a perspective view of a segment of the adjustable guide rail assembly of FIG. 4.

Referring to FIG. 9, a segment of the guide rail assembly 16 of FIG. 1 is illustrated with the adjustable guide members 32a, 32b and 32c. As described above, the adjustable guide members 32a, 32b and 32c are rotatably connected to the outer support frame 30 by the brackets 36 that allow the adjustable guide members 32a, 32b and 32c to rotate relative to the outer support frame 30 and the torsion drive cable 34 that provides a rotating force to rotate the adjustable guide members 32a, 32b and 32c. In some embodiments, the adjustable guide members 32a, 32b and 32c are each interconnected together such that the adjustable guide members 32a, 32b and 32c rotate together between configurations to the same angular position. The adjustable guide members 32a, 32b and 32c each include a face surface 66 that extends between sides 68 and 70 of the adjustable guide members 32a, 32b and 32c. The face surface 66 is generally arcuate and defines a concave profile extending between the sides 68 and 70.

The face surface 66 may be divided into multiple face segments S extending in the widthwise direction of the adjustable guide members 32a, 32b and 32c between the sides 68 and 70. The face segments S may include the large radius face segment 48 and the small radius face segment 50 and may extend along a centerline L extending along a length of the face surface 66. In some embodiments, each face segment S of each adjustable guide member 32a, 32b and 32c has a substantially constant radius along the widthwise direction of each of the face segments S. Additionally, face segments S of adjacent adjustable guide members may have substantially the same constant radius over their widthwise directions. For example, face segment $S_4$ of the adjustable guide member 32a may have the same radius of the face segments $S_4$ of both the adjustable guide members 32b and 32c. For each angular position of the adjustable guide members 32a, 32b and 32c, a face segment S is provided to define the arcuate guide path for the article 14 having a substantially constant radius over the widthwise direction over the adjustable guide member 32a, 32b and 32c. The face segments S of the adjustable members 32a, 32b and 32c are illustrative. For example, the actual dimensions of the face segments S may depend, at least in part, on the angular positions of the adjustable guide members 32a, 32b and 32c, the dimensions of the articles 14 and the contact area(s) between the adjustable guide members 32a, 32b and 32c and the articles 14.

Figure 10:
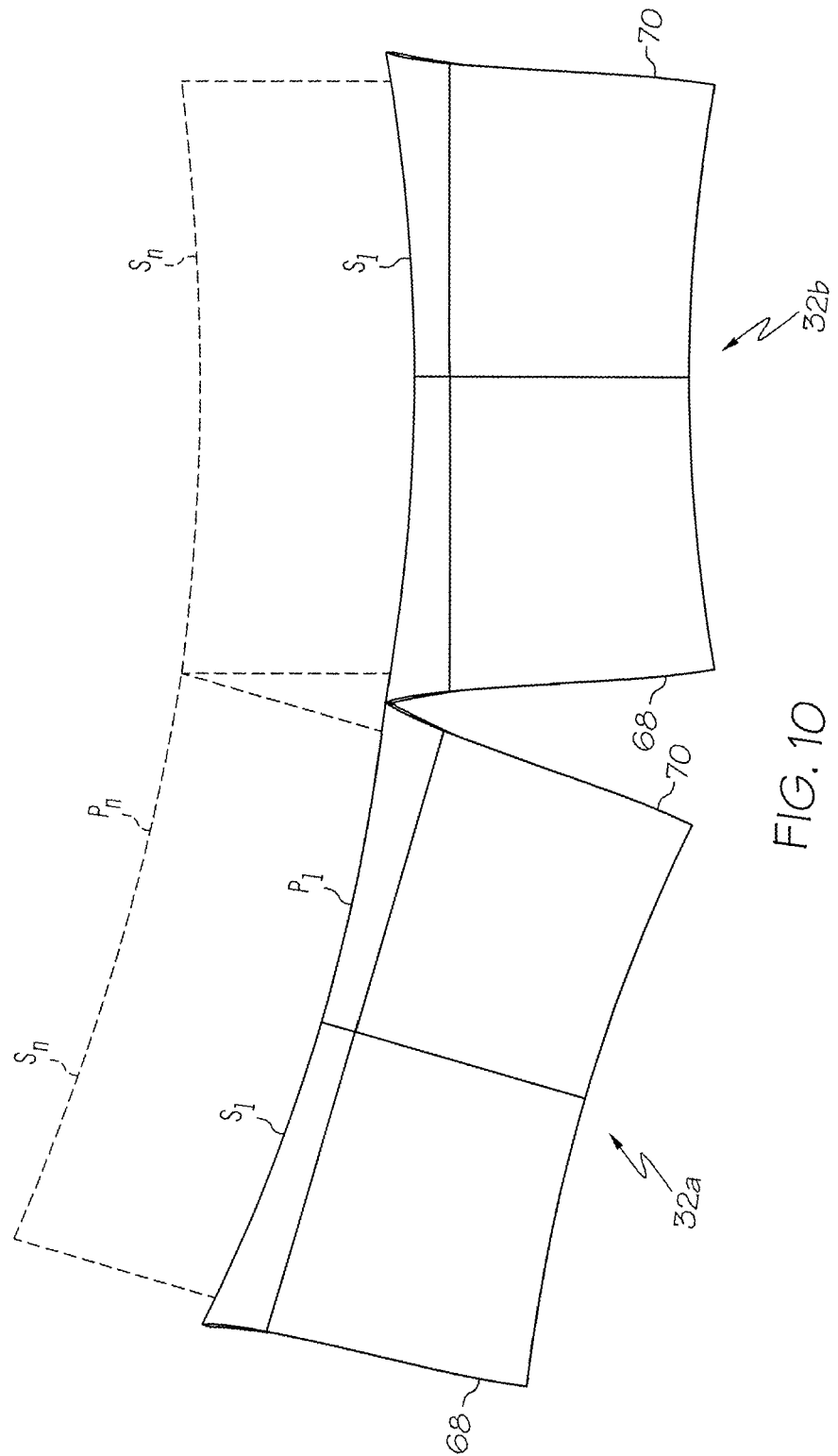
FIG. 10 illustrates operation of the segment of the adjustable guide rail assembly of FIG. 9.

Referring to FIG. 10, the sides 68 and 70 of the adjustable guide members 32 may also be shaped to accommodate rotation of the adjustable guide members 32 between configurations and to maintain minimal spacing, if any, between adjacent adjustable members 32 to provide a substantially continuous arcuate guide path such that the article 14 experiences little if any bump while travelling from one adjustable guide member 32 to the next. FIG. 10 illustrates the adjustable guide members 32a and 32b in both their large article configurations (solid lines) and small article configurations (dashed lines). In the large article configuration, the arcuate guide path $P_1$ extends along the aligned face segments $S_1$ of the adjustable guide members 32a and 32b. At the arcuate guide path $P_1$, a distance between the adjacent adjustable guide members 32a and 32b is within no more than about three percent (e.g., no more than about one percent, such as no more than about 0.5 percent) of the length of the radius of the arcuate guide path $P_1$. Similarly, in the small article configuration, the arcuate guide path $P_n$ extends along the aligned face segments Sn of the adjustable guide members 32a and 32b. At the arcuate guide path $P_n$, a distance between the adjacent adjustable guide members 32a and 32b is within no more than about three percent (e.g., no more than about one percent, such as no more than about 0.5 percent) of the length of the radius of the arcuate guide path $P_n$. Furthermore, in an intermediate configuration, the arcuate guide path $P_{n-x}$ extends along the aligned face segments Sn-x of the adjustable guide members 32a and 32b. At the arcuate guide path $P_{n-x}$, a distance between the adjacent adjustable guide members 32a and 32b is within no more than about three percent (e.g., no more than about one percent, such as no more than about 0.5 percent) of the length of the radius of the arcuate guide path $P_{n-x}$.

Figure 11:
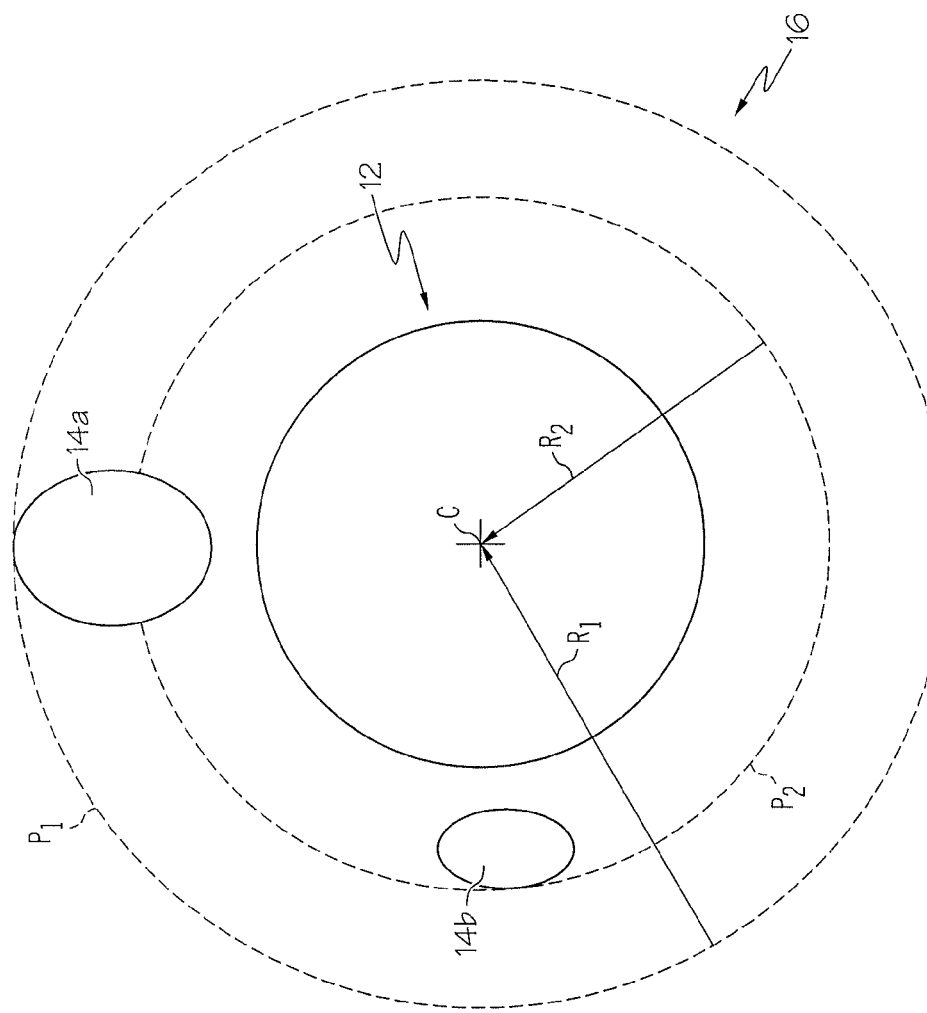
FIG. 11 is a diagrammatic illustration of operation of the adjustable guide rail assembly and star wheel assembly of FIG. 1.

Referring now to FIG. 11, operation of the conveyor system 10 including the star wheel assembly 12 and the adjustable guide rail assembly 16 is illustrated. When conveying a relatively large article, the computer 18 may adjust the star wheel assembly 12 and/or the guide rail assembly 16 automatically using a CAD program in which the CAD program contains the dimensions of a three dimensional article 14a at various levels or elevations. Based on the known dimensions of the article 14a, the computer may rotate the adjustable guide members 32 about their axes of rotation that are substantially parallel to horizontal and/or the arcuate guide path to be formed using the adjustable guide members 32. Alternatively, the star wheel assembly 12 and/or the guide rail assembly 16 may be adjusted manually. Article 14a is relatively large compared to the article 14b. Thus, in this instance, the adjustable guide members 32 may be rotated such that their large radius face segments 58 (FIG. 5) face the star wheel assembly 12. Rotation of the adjustable guide members 32 may be effected using the gearmotor system 48 and torsion drive cable 34. Once the angular position of the guide members 32 are set, an arcuate path $P_1$ is provided about the star wheel assembly 12 of constant radius $R_1$ and center C.

Similarly, when conveying a relatively small article, the computer 18 may adjust the star wheel assembly 12 and/or the guide rail assembly 16 automatically using the CAD program in which the CAD program contains the dimensions of a three dimensional article 14b at various levels or elevations. Based on the known dimensions of the article 14b, the computer may rotate the adjustable guide members 32 about their axes of rotation that are substantially parallel to horizontal and/or the arcuate guide path to be formed using the adjustable guide members 32. Alternatively, the star wheel assembly 12 and/or the guide rail assembly 16 may be adjusted manually. Article 14b is relatively small compared to the article 14a. Thus, in this instance, the adjustable guide members 32 may be rotated such that their small radius face segments 60 (FIG. 5) face the star wheel assembly 12. Rotation of the adjustable guide members 32 may be effected using the gearmotor system 48 and torsion drive cable 34. Once the angular position of the guide members 32 are set, an arcuate path $P_2$ is provided about the star wheel assembly 12 of constant radius $R_2$ and center C.

It should be noted that while the adjustable guide rail assembly 16 is shown in use with the star wheel assembly 12 of FIG. 1, the adjustable guide rail assembly may be used with various adjustable or non-adjustable star wheels. A number of star wheel embodiments may be described in one or more of U.S. Pat. No. 1,981,641; U.S. Pat. No. 2,324,312; U.S. Pat. No. 3,957,154; U.S. Pat. No. 4,124,112; U.S. Pat. No. 5,029,695; U.S. Pat. No. 5,046,599; U.S. Pat. No. 5,082,105; U.S. Pat. No. 5,540,320; U.S. Pat. No. 5,590,753; U.S. Pat. No. 7,398,871 B1; U.S. 2007/0271871 A1; DE 19903319A; EP 0 355 971 B1; EP 0 401 698 B1; EP 0 412 059 B1; EP 0 659 683 B1; EP 0 894 544 A2; EP 1 663 824 B1; JP Publication JP 10035879 A; PCT WO 2005/030616 A2; PCT WO 2009/040531 A1.

Figure 12:
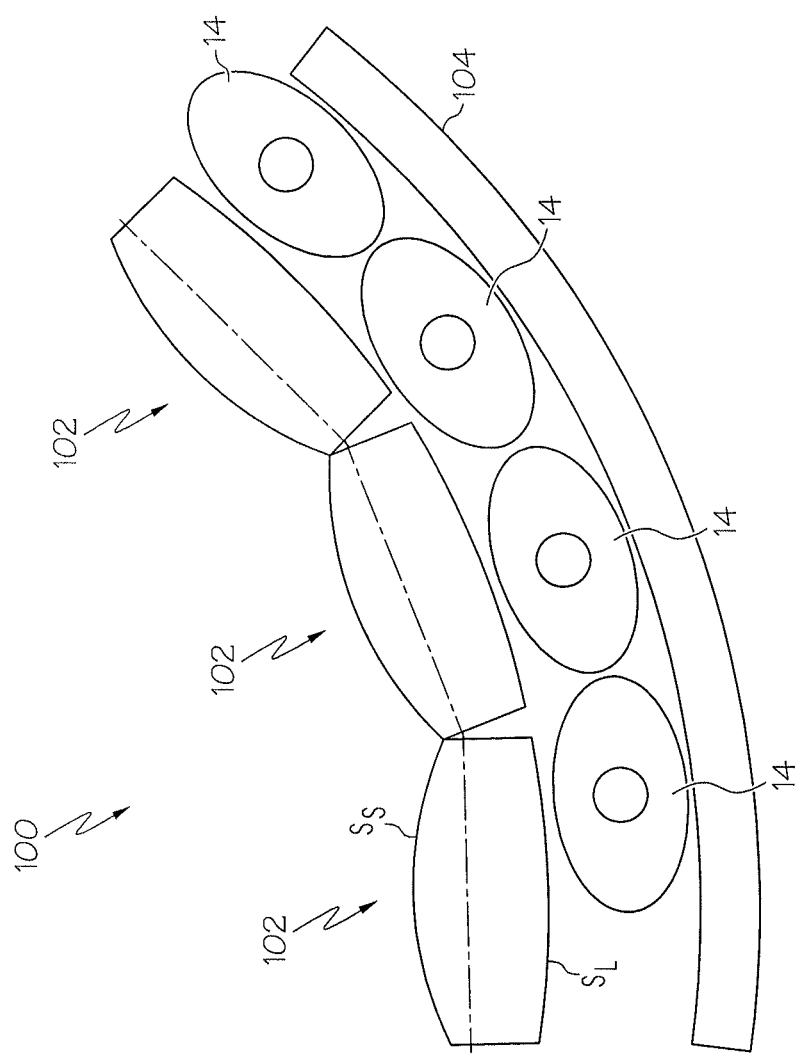
FIG. 12 is a diagrammatic illustration of another embodiment of an adjustable rail assembly.

Referring now to FIG. 12, another embodiment of an adjustable guide rail assembly 100 also includes adjustable guide members 102. In this embodiment, the adjustable guide members 102 can provide an inner-turn arcuate guide path for articles 14 being conveyed, for example, by a table-top conveyor system. A guide wall 104 may be provided to guide the articles 14 between the guide wall 104 and the adjustable guide rail assembly 100. The guide wall 104 may be fixed relative to the adjustable rail assembly 100. Alternatively, the guide wall 104 may be replaced by another adjustable guide rail assembly, such as the guide rail assembly 16 described above.

The adjustable guide members 102 may be rotated to adjust the adjustable guide members 102 between a large article configuration and a small article configuration. Each adjustable guide member 102 may include a large radius face segment 106 and a small radius face segment 108. As opposed to be concave like the adjustable guide members 32 above, the adjustable guide members 102 are convex and somewhat barrel shaped. Of course, in any of the embodiments herein, the adjustable guide members can have a face segment that is linear over their widthwise directions.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "90 degrees" is intended to mean "about 90 degrees".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An adjustable guide rail assembly for a conveyor system, comprising:
   an adjustable guide member having a face extending between opposite sides, a large radius face segment and a small radius face segment, the large radius face segment and the small radius face segment extending widthwise between the opposite sides of the adjustable guide member and each defining an arcuate guide path for a three dimensional article;
   wherein a radius of the arcuate guide path changes by rotating the adjustable guide member from a large article configuration where the large radius face segment having a larger radius defines the arcuate guide path to a small article configuration where the small radius face segment having a smaller radius defines the arcuate guide path.

2. The assembly of claim 1, wherein a center of curvature of the arcuate path remains substantially stationary as the adjustable guide member rotates from the large article configuration to the small article configuration.

3. The assembly of claim 1, further comprising a plurality of adjustable guide members, each adjustable guide member having a face extending between opposite sides, a large radius face segment and a small radius face segment, the large radius face segment and the small radius face segment extending widthwise between the opposite sides of the plurality of adjustable guide members and each defining an arcuate guide path for a three dimensional article;
   wherein the radius of the arcuate guide path changes by rotating the plurality of adjustable guide members from a large article configuration where the large radius face segments having a larger radius defines the arcuate guide path to a small article configuration where the small radius face segments having a smaller radius defines the arcuate guide path.

4. The assembly of claim 3, wherein the arcuate guide path is substantially continuous between adjacent adjustable guide members of the plurality of adjustable guide members.

5. The assembly of claim 3, wherein a distance between adjacent adjustable guide members of the plurality of adjustable guide members along the arcuate guide path is within about 3.0 percent of a length of the radius of the arcuate guide path.

6. The assembly of claim 1, wherein the adjustable guide member rotates about an eccentric axis of rotation.

7. The assembly of claim 1, wherein the large radius face segment of the adjustable guide member is spaced at least about 90 degrees from the small radius face segment of the adjustable guide member.

8. The assembly of claim 1, wherein the large radius face segment of the adjustable guide member is spaced at least about 180 degrees from the small radius face segment of the adjustable guide member.

9. The assembly of claim 1, wherein the radius of the arcuate path changes continuously as the adjustable guide member rotates from the large article configuration to the small article configuration, a center of the arcuate path remains substantially stationary as the adjustable guide member rotates from the large article configuration to the small article configuration.

10. The assembly of claim 9, wherein an axis of rotation of the adjustable guide member is substantially horizontal.

11. A conveyor system, comprising:
a conveyor that conveys three dimensional articles around an arcuate guide path having a central axis;
an adjustable guide rail assembly that defines the arcuate guide path adjacent the conveyor, the adjustable guide rail assembly comprising an adjustable guide member having a profile that transitions from a smaller radius along a small radius face segment of the adjustable guide member to a larger radius along a large radius face segment of the adjustable guide member;
wherein a radius of the arcuate guide path changes by rotating the adjustable guide member from a large article configuration where the large radius face segment having a larger radius defines the arcuate guide path to a small article configuration where the small radius face segment having a smaller radius defines the arcuate guide path.

12. The system of claim 11, wherein a center of curvature of the arcuate path remains substantially stationary as the adjustable guide member rotates from the large article configuration to the small article configuration.

13. The system of claim 11, wherein the conveyor is a star wheel and the central axis of the star wheel is colinear with a center of curvature of the arcuate guide path with the adjustable guide member in the large article configuration and the small article configuration.

14. The system of claim 11, further comprising a plurality of adjustable guide members, each adjustable guide member having a profile that transitions from a smaller radius along a small radius face segment of the adjustable guide member to a larger radius along a large radius face segment of the adjustable guide member, the plurality of adjustable guide members together defining the arcuate guide path for the three dimensional article;
wherein the radius of the arcuate guide path changes by rotating the plurality of adjustable guide members together from a large article configuration where the large radius face segments of the plurality of adjustable guide members having the larger radii define the arcuate guide path to a small article configuration where the small radius face segments of the plurality of adjustable guide members having the smaller radii define the arcuate guide path.

15. A method of adjusting an adjustable guide assembly for changing an arcuate guide path about a conveyor, the method comprising:
providing an adjustable guide member having a profile that transitions from a smaller radius along a small radius face segment of the adjustable guide member to a larger radius along a large radius face segment of the adjustable guide member, the adjustable guide member defining the arcuate guide path for a three dimensional article; and
rotating the adjustable guide member from a large article configuration where the large radius face segment of the adjustable guide member having the larger radius defines the arcuate guide path to a small article configuration where the small radius face segment of the adjustable guide member having the smaller radius defines the arcuate guide path.

16. The method of claim 15, wherein a center of curvature of the arcuate guide path remains substantially stationary during the step of rotating the adjustable guide member from the large article configuration to the small article configuration.

17. The method of claim 15, comprising providing a plurality of adjustable guide members, each adjustable guide member having a profile that transitions from a smaller radius along a small radius face segment of the adjustable guide member to a larger radius along a large radius face segment of the adjustable guide member, the plurality of adjustable guide members together defining the arcuate guide path for the three dimensional article.

18. The method of claim 17, further comprising rotating the plurality of adjustable guide members together from a large article configuration where the large radius face segments of the plurality of adjustable guide members having the larger radii define the arcuate guide path to a small article configuration where the small radius face segments of the plurality of adjustable guide members having the smaller radii define the arcuate guide path.

19. The method of claim 18, wherein the arcuate guide path is substantially continuous between adjacent adjustable guide members of the plurality of adjustable guide members.

20. The method of claim 18, wherein a distance between adjacent adjustable guide members of the plurality of adjustable guide members along the arcuate guide path is within about 3.0 percent of a length of the radius of the arcuate guide path.

* * * * *